(12) United States Patent
Endo et al.

(10) Patent No.: US 7,242,642 B2
(45) Date of Patent: Jul. 10, 2007

(54) HIGH SPEED RECORDING AND REPRODUCING FOR OPTICAL DISK DEVICE OF DIFFERENT FORMAT

(75) Inventors: Satoshi Endo, Katano (JP); Kazuo Tamura, Ibaraki (JP); Akihiro Mitani, Settsu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 651 days.

(21) Appl. No.: 10/609,477

(22) Filed: Jul. 1, 2003

(65) Prior Publication Data

US 2004/0005144 A1    Jan. 8, 2004

(30) Foreign Application Priority Data

Jul. 1, 2002 (JP) .............................. 2002-192230
Jul. 10, 2002 (JP) .............................. 2002-201370

(51) Int. Cl.
G11B 21/08 (2006.01)

(52) U.S. Cl. ................ 369/30.05; 369/30.15; 369/47.12

(58) Field of Classification Search ............. None
See application file for complete search history.

(56) References Cited

U.S. PATENT DOCUMENTS

| | | | |
|---|---|---|---|
| 5,612,933 A | | 3/1997 | Iso et al. |
| 5,732,059 A | * | 3/1998 | Katsuyama et al. ..... 369/47.12 |
| 5,751,678 A | * | 5/1998 | Tanaka ................... 369/53.24 |
| 5,862,104 A | * | 1/1999 | Matsumoto ................. 369/7 |
| 5,926,449 A | | 7/1999 | Hiok et al. |
| 5,963,521 A | * | 10/1999 | Nagashima et al. ..... 369/53.37 |
| 6,137,642 A | * | 10/2000 | Inoue ..................... 369/53.24 |
| 6,388,959 B1 | * | 5/2002 | Kondo .................... 369/30.19 |
| 6,388,965 B2 | * | 5/2002 | Ozawa et al. ........... 369/47.12 |
| 6,493,299 B2 | * | 12/2002 | Sato ....................... 369/47.12 |
| 6,556,518 B2 | * | 4/2003 | Isobe et al. ............. 369/30.19 |
| 7,187,627 B2 | * | 3/2007 | Nonaka et al. .......... 369/30.05 |

FOREIGN PATENT DOCUMENTS

| | | |
|---|---|---|
| EP | 1 130 588 | 9/2001 |
| JP | 7-37341 | 2/1995 |
| JP | 11-250567 | 9/1999 |
| JP | 2000-357367 | 12/2000 |
| JP | 2001-312865 | 11/2001 |
| JP | 2002-170239 | 6/2002 |

* cited by examiner

Primary Examiner—Tan Dinh
(74) Attorney, Agent, or Firm—Wenderoth, Lind & Ponack L.L.P.

(57) ABSTRACT

In an optical disk high-speed replaying/recording apparatus, a first read data quality determining section determines a quality of read second units of digital data. Upon determination that the quality of the second units of digital data is low, a first re-reading section re-reads the first units of digital data tracks, sectors, or data blocks in the second units at a third replay speed obtained by subtracting a first predetermined speed from a second replay speed. With this, the optical disk can be replayed at a speed higher than the normal replay speed, and reproduced data can be recorded on a writable optical disk except defective data caused by reproduction defects.

12 Claims, 6 Drawing Sheets

$Le \leqq Lno$ $Le \leqq Lni$

ZCLV

Le≦Lni≦Lno

ZCAV

Le≦Lno≦Lni

HIGH SPEED RECORDING AND REPRODUCING FOR OPTICAL DISK DEVICE OF DIFFERENT FORMAT

BACKGROUND OF THE INVENTION

1. Field of the Invention

The present invention relates to an optical disk high-speed replaying/recording apparatus which replays an optical disk at a speed higher than a normal replay speed for reading data recorded on the optical disk, and records the read data on a writable/rewritable optical disk. More specifically, the present invention relates to a high-speed replaying/recording apparatus which replays an optical disk at a replay speed suitable for the optical disk.

2. Description of the Background Art

In recent years, there have been developments of optical disk high-speed replaying/recording apparatuses capable of reproducing data recorded on various types of optical disks typified by CDs and DVDs at a speed higher than the original replay speed and also recording the reproduced data on another writable/rewritable optical disk.

The operation of a typical example of the optical disk high-speed replaying/recording apparatuses in which a CD is used as a recording source optical disk and an MD is used as a writable/rewritable optical disk is briefly described below. The CD having recorded thereon music or non-music data is rotated at a speed higher than the normal replay speed. The recorded data is then read in units smaller than tracks. The read data is then written in the MD in predetermined recording units (data blocks smaller than reading units or tracks, or CDs).

Management information regarding this written data is written in a UTOC (User Table of Content) area of the MD, thereby achieving completion of recording of the data reproduced from the CD onto the MD. The management information written in this UTOC area is hereinafter referred to as UTOC information. The UTOC information can be written/rewritten by users in the UTOC area in accordance with the data writing state. On the other hand, as is well known, TOC (Table of Content) information cannot be arbitrarily written or rewritten by users in a TOC area provided on a read-only optical disk, such as a CD.

In the optical disk high-speed replaying/recording apparatus, data is read from a recording source optical disk (CD) by rotating the disk at a high speed obtained by increasing a normal replay speed several-fold. Therefore, in some cases, the recorded data cannot be correctly read from the CD due to replay inhibiting factors negligible at normal replay, such as, firstly, surface flaws or deformation of the CD; secondly, insertion accuracy; thirdly, circuit noise; and lastly combinations of those. Consequently, data cannot be correctly recorded in the MD. In such cases, even though the user desires high-speed replaying/recording, the replay speed has to be reduced to a speed at which data can be correctly read from the CD in order to record the data on the writable/rewritable optical disk.

Of the above replay inhibiting factors, physical defects of the medium, such as surface flaws or deformation of the CD, are not influenced by the replay speed itself. However, as the rotational speed, that is, the replay speed, of the CD is lower, the degree of inhibition regarding optical reading by an optical pickup is lower, and therefore data reading is improved. Also, positional accuracy, such as accuracy of insertion of the CD in the CD drive, is not influenced by the replay speed itself. However, as the rotational speed of the CD is lower, the degree of changes in positional relation between the optical pickup and a pit caused by errors in positional accuracy is lower, and therefore data reading is further improved. Furthermore, electrical inhibiting factors, such as circuit noise, are basically not influenced by the rotational speed of the CD, but are influenced by the replay speed as electrical processing. That is, as the replay speed is lower, influences of noise are smaller, and therefore data reproduction is improved.

In the above various replay inhibiting factors, the inability to normally reproduce the recorded data from the CD at high speed replay is a direct reason for the inability to normally record the data on the MD. Therefore, whatever the true reason for trouble in data reproduction is, the optical disk high-speed replaying/recording apparatus is structured so as to reduce the rotational speed, that is, the replay speed, of the CD for a recovery of normal reproduction of the recorded data, and then recording the reproduced data on the MD.

The CD, which is an example of the above-described recording source optical disk, is under CLV (Constant Linear Velocity) control so that the linear velocity is constant. That is, when a read position is at the inner rim side, the rotational speed is higher compared with a case where the read position is at the outer rim side. Also, depending on the types of the optical disks other than the CD, various rotation control schemes are used, such as a CAV (Constant Angular Velocity) scheme, a ZCAV (Zone Constant Angular Velocity) scheme, and a ZCLV (Zone Constant Linear Velocity) scheme. Therefore, the replay speed and the rotational speed of the optical disk do not have a fixed relation. Rather, depending on the read/replay position of the optical disk, the optical disk can be rotated at a different speed even with the same replay speed. However, the above control schemes are similar to each other in that the optical disk high-speed replaying/recording apparatus is structured to reduce the replay speed (rotational speed) when reading cannot be made, thereby waiting until reading of the recorded data is improved.

As described above, in the optical disk high-speed replaying/recording apparatus, depending on the read/replay position, the rotational speed of the optical disk is varied even with the same replay speed. Therefore, influences of the above three replay inhibiting factors are varied depending on the read/replay position. For example, consider a case where there is a data reproduction factor of a uniform size in the radial direction of the optical disk. In this case, when high-speed replaying/recording is performed at a constant replay speed, data reproduction can be successfully made in the outer rim, but can fail in the inner rim, or vice versa. Furthermore, the replay inhibiting factor can be varied in size, and also can be located in various places. Therefore, a sudden halt to replay or a sudden start of replay can occur during high-speed replaying/recording.

In the optical disk high-speed replaying/recording apparatus, every time the recorded data is read and reproduced from the CD, the data is actually recorded on the MD in sequence, and its UTOC information is written in units of tracks or CDs, thereby completing recording on the MD. Therefore, if reproduction defects occur in the course of recording data on the MD, depending on the timing of writing the UTOC information, defective data may be recorded on the MD at least in units of tracks or CDs. In that case, inconveniences may occur depending on the type of the recorded defective data or the location of the defective data, such as that the data which has been read from the CD and then recorded on the MD cannot be read in units of tracks or CDs.

In order to prevent such inconveniences, the following measure is required. That is, when replay abnormality occurs at a read position, the replay speed is reduced stepwise to an appropriate replay speed which allows normal replay at that read position, and then data reproduction is restarted at the reduced replay speed. The replay speed at the time of restarting high-speed replaying/recording is obtained by reducing a predetermined speed from the original replay speed of high-speed replaying/recording. In this sense, the replay speed at the time of restarting is hereinafter referred to as a reduced replay speed.

However, the read data units to be reproduced at the newly-found appropriately reduced replay speed from the read position where the replay abnormality occurred are different in replaying and recording conditions from other data units that have already been read and recorded on the MD. Therefore, consistency in the recorded data will be disadvantageously lost. In order to prevent such disadvantages, a read position from which data reproduction is restarted at the reduced replay speed has to be a predetermined number of read data units behind the position where replay abnormality occurred.

That is, it is practically meaningless to record each read data unit alone on the MD for reproduction. Instead, by recording a plurality of read data units on the MD in accordance with predetermined rules, a meaningful piece of record data unit is formed on the MD, and is utilized by users. In one example where the CD contains music tracks, a predetermined number of read data units are sequentially recorded on the MD in accordance with predetermined rules, thereby completing a piece of track data corresponding to one track. In another example where the CD contains computer data, a predetermined number of read data units are sequentially recorded on the MD in accordance with predetermined rules, thereby completing a piece of sector data. A collection of such pieces of sector data forms a file.

However, the read data units to be reproduced at the newly-found appropriate reduced replay speed from the read position where replay abnormality occurred are different in replaying and recording conditions from other data units that have been already read and recorded on the MD. Therefore, consistency in the recorded data will be disadvantageously lost. Consequently, further recording of such inconsistent data units to form a piece of track data on the MD makes it impossible to reproduce correct information from the track data.

In order to prevent such inconsistency in the recorded data units, reproducing is restarted at the reduced replay speed by going back to the read start position of the recorded data unit (track, file) to which the read data unit having defects belongs. That is, the read data unit that has been already reproduced at the original high-speed replay speed has to be redundantly reproduced under different conditions.

However, as described above, the replay inhibiting factor can be varied in size, and also can be located in various places. Therefore, a sudden halt to replay or a sudden start of replay can occur at high-speed replaying/recording. In other words, even when high-speed replay is started at a newly-set reduced replay speed, defects may occur before the completion of reproduction of the entire record units after only a few read data units are reproduced from the read position where reproduction defects occurred.

As such, frequent occurrences of read defects even at the reduced replay speed would increase redundant work loads in reproducing the already-reproduced data unit. These increased work loads significantly impair the high-speed replaying/recoding function, at which the optical disk high-speed replaying/recording apparatus is originally aimed. In worst cases, it takes more time compared with a case of replaying/recording the CD at its original normal speed.

SUMMARY OF THE INVENTION

Therefore, an object of the present invention is to provide an optical disk high-speed replaying/recording apparatus which reads and reproduces data recorded on an optical disk at a speed higher than the normal replay speed of the optical disk, and records the reproduced data on a writable/rewritable optical disk except defective data caused by reproduction defects.

The present invention has the following features to attain the object mentioned above.

An aspect of the present invention is directed to an optical disk high-speed replaying/recording apparatus which reads, from a first optical disk having recorded thereon digital data in first units to be reproduced at a first replay speed which is a normal replay speed, the digital data in second units smaller than the first units at a second replay speed higher than the first replay speed, writes the read second units of digital data in a writable second optical disk, and then records the first units in the second optical disk, the apparatus including:

a first read data quality determining section for determining a quality of the read second units of digital data; and a first re-reading section for re-reading, upon determination that the quality of the second units of digital data is low, the first units of digital data in the second units at a third replay speed obtained by subtracting a first predetermined speed from the second replay speed.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
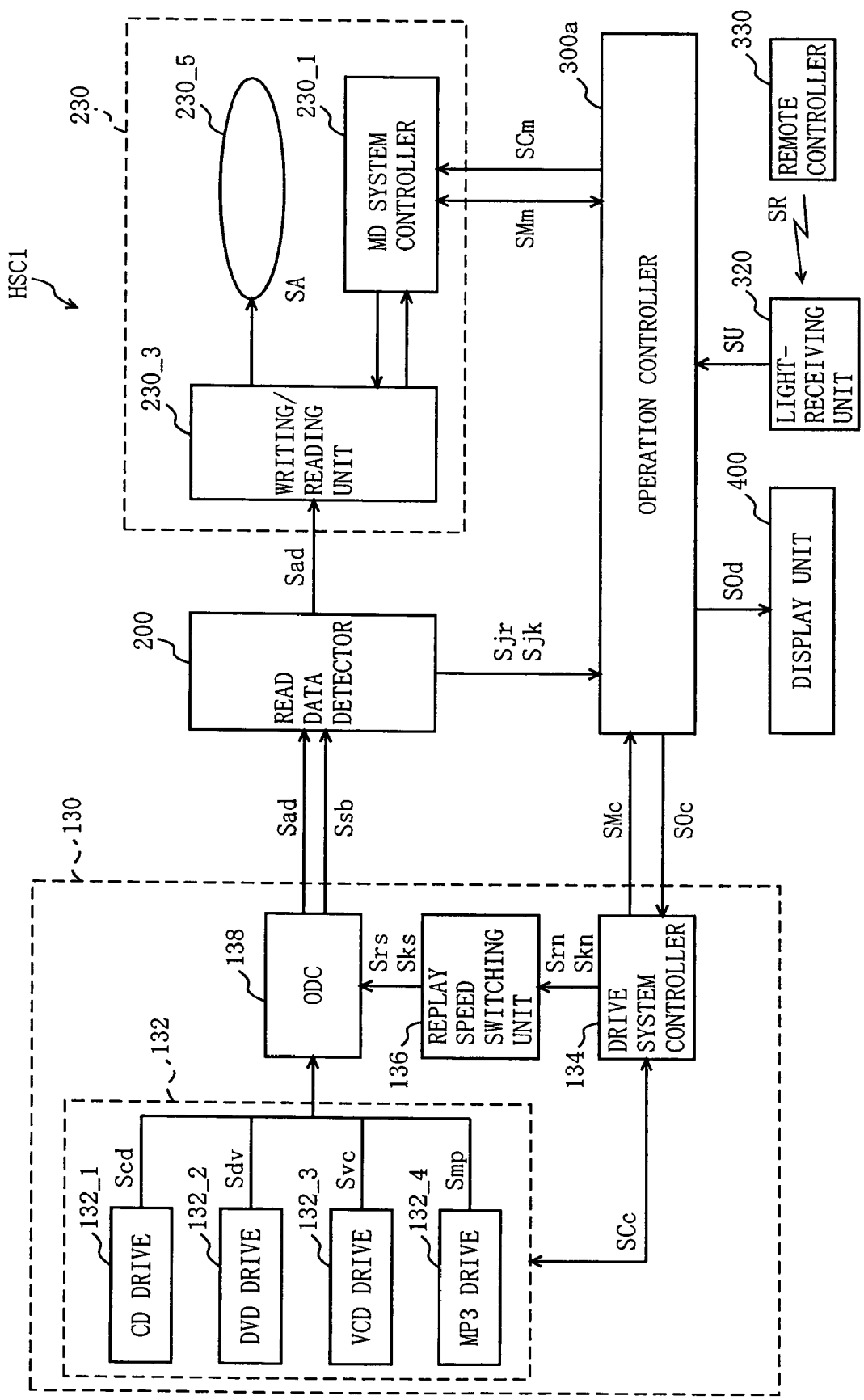
FIG. 1 is a block diagram illustrating the configuration of an optical disk high-speed replaying/recording apparatus according to a first embodiment of the present invention.
Figure 2:
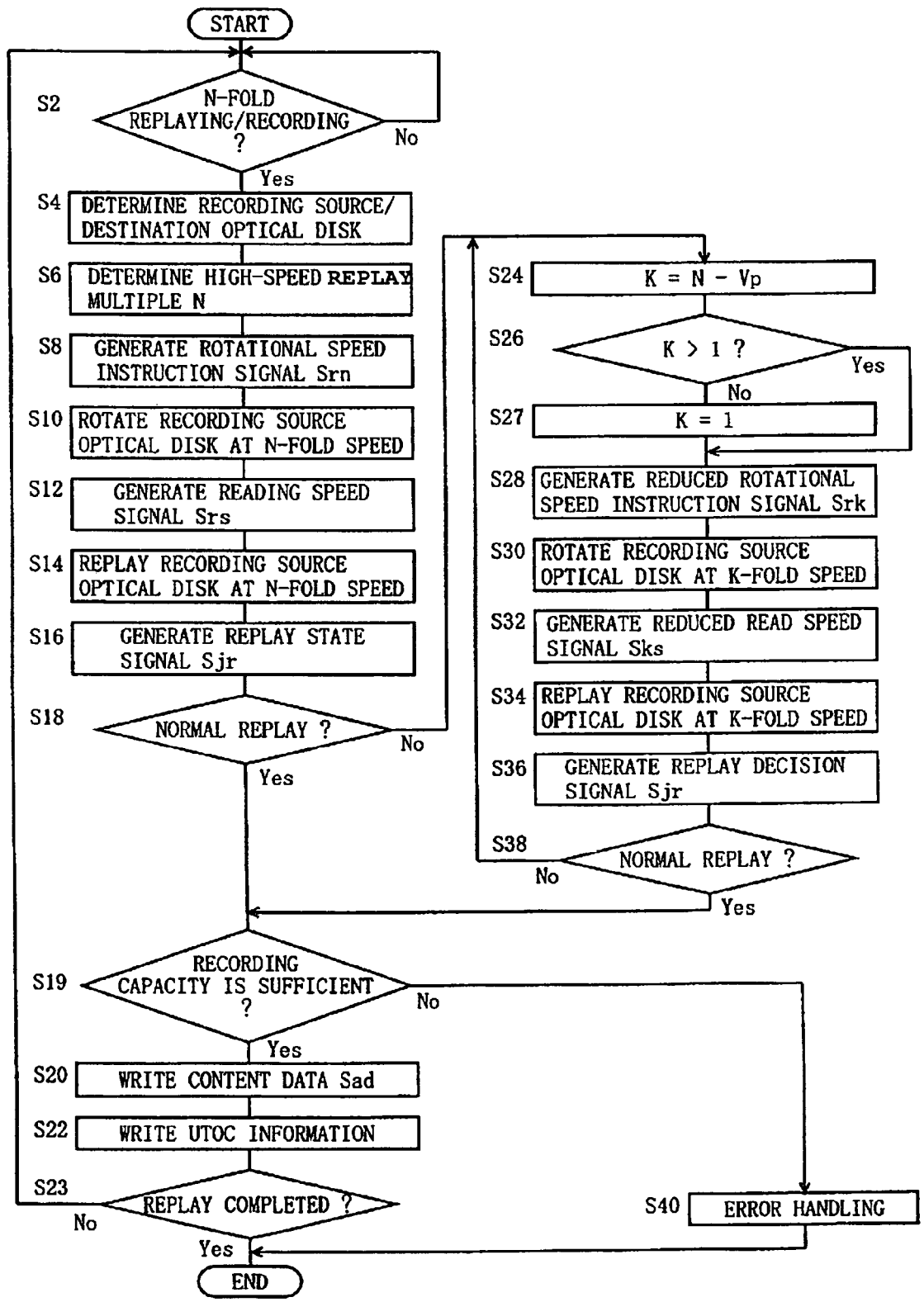
FIG. 2 is a flow chart showing the operation of the optical disk high-speed replaying/recording apparatus illustrated in FIG. 1.

With reference to FIGS. 1 and 2, an optical disk high-speed replaying/recording apparatus according to a first embodiment of the present invention is described below. As illustrated in FIG. 1, an optical disk high-speed replaying/recording apparatus HSC1 broadly includes a combination drive 130, a read data detector 200, an MD drive 230, an operation controller 300a, and a display unit 400. Also, the optical disk high-speed replaying/recording apparatus HSC1 includes a read signal processing unit for performing various processes on signals read from the combination drive 130 and the MD drive 230 to generate audio signals, video, or computer data for output to a loudspeaker, a monitor, or another recording apparatus. However, such a read signal processing unit is not a feature of the present invention, and therefore is not described herein or illustrated in the drawings.

The display unit 400 is preferably structured by a light-emitting means, such as a vacuum fluorescent display, for optically presenting information, such as an operation mode of the optical disk high-speed replaying/recording apparatus HSC1 to users. The operation controller 300a is connected to the combination drive 130, the MD drive 230, the above-mentioned read signal processing unit (not shown), and the display unit 400 so as to control the entire operation of the optical disk high-speed replaying/recording apparatus HSC1.

The combination drive 130 includes at least one optical disk drive 132, a drive system controller 134, a replay speed switching unit 136, and an optical disk controller (denoted as "ODC" in FIG. 1) 138. In the optical disk drive 132, various types of optical disk media can be inserted. With an optical medium being inserted, the optical disk drive 132 readsrecorded data therefrom for output to the optical disk controller 138. The optical disk drive 132 includes a means for detecting the type of the inserted optical disk. Based on the detection results, the inserted optical disk is recognized as being for an optical disk drive corresponding to the detected type of the optical disk. In this specification, for convenience in description, different drives are used for different optical disks. That is, the optical disk drive 132 includes optical disk players typified by a CD drive 132_1, a DVD drive 132_2, a VCD drive 132_3, and an MP3 drive 132_4.

The CD drive 132_1 reads music data or digital data typified by computer programs from the inserted CD for output as CD data Scd. The DVD drive 132_2 reproduces MPEG data Sdv from a DVD for output. The VCD drive 132_3 reproduces an audio signal from a video CD for output as a video CD audio signal Svc. The MP3 drive 132_4 reproduces audio data from an MP3 file recorded on the optical disk for output as an MP3 audio signal Smp. The drive system controller 134 is connected to the optical disk drive 132 for mutually exchanging a combination drive control signal SCc, controlling the operation of the optical disk drive 132, and further detecting the type of the optical disk inserted in the optical disk drive 132.

The MD drive 230 includes an MD system controller 230_1 and a writing/reading unit 230_3. The MD drive 230 further includes a means for driving an MD and other related components. These means and components are, however, not a feature of the present invention, and therefore are not described herein. The MD drive 230 writes, in the MD, the CD data Scd that has been read from the CD, reproduced, and then supplied by the combination drive 130 through the read data detector 200, or reads data written in the MD. The MD system controller 230_1 controls writing/reading performed by the writing/reading unit 230_3 on a writable/rewritable optical disk 230_5. This control is based on an MD drive state signal SMm and a combination drive state signal SMc.

The operation controller 300a preferably includes a light-receiving unit 320 and a remote controller 330. The user operates the remote controller 330 to give an instruction to the optical disk high-speed replaying/recording apparatus HSC1. That is, the remote controller 330 emits a remote control signal SR in accordance with user's operations. The light-receiving unit 320 receives the remote control signal SR emitted from the remote controller 330 to output a user operation signal SU reflecting the user's operational intention to the operation controller 300a.

Based on the user instruction signal SU supplied by the light-receiving unit 320, the operation controller 300a generates a combination drive control signal SOc for controlling the operation of the combination drive 130 for output to the drive system controller 134. Based on the combination drive control signal SOc, the drive system controller 134 generates a combination drive control signal SCc for controlling the optical disk drive 132. The drive system controller 134, on the other hand, generates a combination drive state signal SMc including medium identification information representing the type of the optical disk inserted in the optical disk drive 132 and information about the state of operation of the combination drive 130, and then outputs the generated signal to the operation controller 300a.

Based on the user instruction signal SU, the combination drive state signal SMc, a reading/reproducing state signal Sjr, and the MD drive state signal SMm, the operation controller 300a generates an MD control signal SCm for controlling the operation of the MD drive 230 for output to the MD drive 230.

In the present embodiment, the optical disk high-speed replaying/recording apparatus HSC1 preferably uses a CD as a recording source optical disk and an MD (writable/rewritable optical disk 230_5) as a recording destination optical disk, as with Background Art. Therefore, the drive system controller 134 generates a rotational speed instruction signal Srn indicative of a rotational speed corresponding to the replay speed designated by the combination drive control signal SOc supplied by the operation controller 300a, and then outputs the generated signal Srn to the replay speed switching unit 136. In accordance with the type of the rotation control scheme (ZCAV, ZCLV, or CAV), the drive system controller 134 generates a rotational speed instruction signal Srn for rotation at the replay speed designated by the user.

Based on the rotational speed instruction signal Srn, the replay speed switching unit 136 causes the CD drive 132_1 to perform rotation at a speed corresponding to the replay speed designated by the user. That is, the rotational speed is changed depending on a position in the diameter direction so that a linear velocity, which represents a speed of reading data, at a read position is equal to the replay speed designated by the user. The replay speed switching unit 136 generates a reading speed signal Srs indicative of a speed of reading data from the CD, and then outputs the generated signal Srs to the optical disk controller 138.

Based on the reading speed signal Srs, the optical disk controller 138 retrieves, from the CD data Scd supplied by the CD drive 132_1, audio data (or computer content data) Sad and a sub code Ssb for output to the read data detector 200. Note that, although the data output from the optical disk controller 138 varies depending on the type of the recording source optical disk, what is basically output is content data and management data corresponding to the audio data Sad and the sub code Ssb, respectively, in the case of a CD. In this sense, the audio data Sad and the sub code Ssb retrieved from the CD data Scd are hereinafter referred to as content data Sad and content management data Ssb, respectively, as required.

Based on the content data Sad and the content management data Ssb, the read data detector 200 generates a replay state signal Sjr indicative of whether reading/reproducing of the data from the CD is normally performed, and then outputs the generated signal Sjr to the operation controller 300a.

Based on the user instruction signal SU, the operation controller 300a further replays the CD inserted in the CD drive 132_1 at an N-fold normal replay speed (N is an arbitrary positive number) so as to cause the reproduced data to be recorded on the MD. Also, based on the above-described user instruction signal SU, the combination drive state signal SMc, and the MD drive state signal SMm, the operation controller 300a generates an operation state display signal SOd indicative of the state of operation of the optical disk high-speed replaying/recording apparatus HSC1, and then outputs the generated signal SOd to the display unit 400. Based on the operation state display signal SOd, the display unit 400 uses an optical display technique to present to the user the state of operation of the optical disk high-speed replaying/recording apparatus HSC1.

With reference to the flow chart illustrated in FIG. 2, only the optical disk high-speed replaying/recording procedure performed by the optical disk high-speed replaying/recording apparatus HSC1 is described. When the optical disk high-speed replaying/recording apparatus HSC1 is powered ON to start the operation, the operation controller 300a first determines in step S2 based on the user instruction signal SU whether an instruction has been given for high-speed replaying/recording of the optical disk. If it is determined as No, the process of this step is repeated until it is determined as Yes. The control procedure then goes to the next step S4.

In step S4, based on the user instruction signal SU, the operation controller 300a determines a recording source optical disk and recording destination optical disk. As described above, whether a recording source optical disk (CD) and an MD (recording destination optical disk) have been inserted in the combination drive 130 and the MD drive 230 is automatically detected. Therefore, if no recording source optical disk (CD) or no recording destination optical disk (MD) has been inserted, the user cannot select high-speed recording. For this reason, in this step S4, whether the recording source optical disk and the recording destination optical disk have been inserted is always determined. In the present example, the inserted CD and the inserted MD are determined and recognized as the recording source optical disk and the recording destination optical disk, respectively. The control procedure then goes to the next step S6.

In step S6, based on the user instruction signal SU, the operation controller 300a detects a high-speed replay multiple N, which defines by how much the normal replay speed of the recording source optical disk is multiplied. That is, in the present example, it is determined by how much the normal speed of the CD is multiplied for recording data on the MD. The high-speed replay multiple N determined in this step is supplied as a combination drive control signal SOc to the drive system controller 134. The control procedure then goes to the next step S8.

In step S8, based on the high-speed replay multiple N, the drive system controller 134 determines the rate of rotation of the recording source optical disk to generate a rotational speed instruction signal Srn for output to the replay speed switching unit 136. As described above, depending on the type of the optical disk and the scheme for controlling the rotation of the optical disk, the rate of rotation (angular velocity) defined by the rotational speed instruction signal Srn is not necessarily constant with respect to the same replay speed. Therefore, needless to say, an N-fold replay speed is not necessarily equal to an N-fold angular velocity. The control procedure then goes to the next step S10.

In step S10, based on the rotational speed instruction signal Srn, the replay speed switching unit 136 rotates the recording source optical disk (CD) inserted in the optical disk drive 132 (CD drive 132_1) at the N-fold normal replay speed. The control procedure then goes to the next step S12.

In step S12, the replay speed switching unit 136 detects a reading speed at the read position of the optical disk (CD) being rotated at the N-fold normal replay speed to generate a reading speed signal Srs for output to the optical disk controller 138. That is, the reading speed signal Srs corresponds to a speed at which data is read from the optical disk and is then supplied to the optical disk controller 138. The control procedure then goes to the next step S14.

In step S14, based on the reading speed signal Srs, the optical disk controller 138 reproduces, at the N-fold normal replay speed, the data (CD data Scd) being read by the optical disk drive 132 (CD drive 132_1) from the optical disk (CD) at the N-fold normal replay speed. The optical disk controller 138 then retrieves content data (audio data) Sad and management data (sub code) Ssb from the read data for output to the read data detector 200. The control procedure then goes to the next step S16.

In step S16, based on the content data (audio data) Sad and the management data (sub code) Ssb, the read data detector 200 generates a replay state signal Sjr indicative of the state of replay for output to the operation controller 300a. The control procedure then goes to the next step S18.

In step S18, the operation controller 300a determines based on the replay state signal Sjr whether the recorded data is being normally reproduced from the recording source optical disk (CD). In this example, it is determined that the data is being normally reproduced when a predetermined amount of reproduced data is supplied within a predetermined time period. Otherwise, it is determined that the data is not being normally reproduced. If the determination is Yes, that is, the data is being normally reproduced, the control procedure goes to step S19.

In step S19, the MD drive 230 determines whether the writable/rewritable optical disk 230_5 has a recording capacity capable of recording the content data Sad supplied thereto. If the capacity is sufficient, the determination is Yes, and then the control procedure goes to step S20.

In step S20, the writing/reading unit 230_3 writes the content data Sad supplied via the read data detector 200 to the MD drive 230 in the writable/rewritable optical disk (MD) 230_5 in predetermined recording units. In the present invention, the recording units can be units of sectors, units of tracks, units of recording source or destination optical disk. In the present embodiment, however, units smaller than units of sectors are preferable. In this manner, the content data Sad sequentially read from the recording source optical disk (CD) is written in the writable/rewritable optical disk 230_5 in recording units smaller than units of sectors. The control procedure then goes to the next step S22.

In step S22, UTOC information regarding writing in step S20 of the content data Sad in the writable/rewritable optical disk 230_5 (MD) is generated by the MD system controller 230_1, and is then written in a UTOC area of the writable/rewritable optical disk 230_5 (MD). The control procedure then goes to the next step S23.

In step S23, the operation controller 300a determines whether the replay of the recording source optical disk has been completed. If the determination is Yes, the high-speed replaying/recording operation of the optical disk high-speed replaying/recording apparatus HSC1 ends.

If the determination is No in the above step S18, that is, if it is determined that high-speed replay of the recording source optical disk is not normally performed, the control procedure goes to step S24.

In step S24, the operation controller 300a subtracts a deceleration value Vp from the high-speed replay multiple N to find a sub-high-speed replay multiple K. The deceleration value Vp is a value appropriately predetermined with a view to recovery of the replay state from the defective state occurring at the optical disk high-speed replaying/recording apparatus HSC1 by slightly reducing the replay speed (rotational speed). Preferably, the deceleration value Vp is not larger than (the high-speed replay multiple N−1). That is, if the deceleration value Vp is N−1, the sub-high-speed replay multiple K is 1, which is equal to the normal replay speed, thereby aiming for a recovery of the replay state by replaying the recording source optical disk (CD) at the normal replay speed. The control procedure then goes to the next step S26.

In step S26, the operation controller 300a further determines whether the sub-high-speed replay multiple K is larger than 1. If the determination is Yes, that is, if the sub-high-speed replay multiple K is larger than 1, the sub-high-speed replay multiple K is supplied to the drive system controller 134 as the combination drive control signal SOc instead of the high-speed replay multiple N. The processes in steps S24 and S26 are similar to the process in the above-described step S6, but are different therefrom in the following point. That is, in step S6, the high-speed replay multiple N is determined as the user's instruction (user instruction signal SU). By contrast, in step S24, for the purpose of mitigating the defective replay, the high-speed replay multiple N is reduced by the predetermined deceleration value Vp to obtain the sub-high-speed replay multiple K. The control procedure then goes to the next step S28.

If it is determined as No in step S26, that is, if the sub-high-speed replay multiple K is not larger than 1, the procedure goes to step S27.

In step S27, the sub-high-speed replay multiple K is set to 1 in order to prevent deceleration to a speed lower than the normal replay speed. If a speed lower than the normal replay speed is desired, however, it can be determined in step S26 whether K>0, and then K can be set in step S27 as a positive value. The control procedure then goes to the above-described step S28.

In step S28, as with the above-described step S8, based on the high-speed replay multiple N, the drive system controller determines the rate of rotation (rpm) of the recording source optical disk to generate a rotational speed instruction signal Srn for output to the replay speed switching unit 136. Here, for convenience in description, the rotational speed instruction signal Srn generated in this step is hereinafter referred to as a reduced rotational speed instruction signal Srk for identification. The control procedure then goes to the next step S30.

In step S30, as with the above-described step S10, the replay speed switching unit 136 causes, based on the reduced rotational speed instruction signal Srk, the recording source optical disk (CD) inserted in the optical disk drive 132 (CD drive 132_1) to rotate at the K-fold replay speed. The control procedure then goes to the next step S32.

In step S32, as with the above-described step S12, the replay speed switching unit 136 detects a reading speed at the read position of the optical disk (CD) being rotated at the K-fold replay speed to generate a reduced reading speed signal Sks for output to the optical disk controller 138. Note that the reduced speed signal Sks is basically the same as the reading speed signal Srs, but has a smaller value than the reading speed signal Srs. The control procedure then goes to the next step S34.

In step S34, as with the above-described step S14, the optical disk controller 138 causes, based on the reduced reading speed signal Sks, the optical disk drive 132 (CD drive 132_1) to reproduce, at the K-fold replay speed, data (CD data) Scd being read from the optical disk (CD) at the K-fold replay speed, and to retrieve content data (audio data) Sad and management data (sub code) Ssb for output to the read data detector 200. The control procedure then goes to the next step S36.

In step S36, as with the above-described step S16, the read data detector 200 generates, based on the content data (audio data) Sad and the management data (sub code) Ssb, a decelerated replay state signal Sjk indicative of the replay state at the reduced speed, and then outputs the generated signal Sjk to the operation controller 300a. The control procedure then goes to the next step S38.

In step S38, as with the above-described step S18, the operation controller 300a determines based on the decelerated replay state signal Sjk whether the recorded data from the recording source optical disk (CD) is being normally reproduced. If the determination is Yes, that is, if the recorded data is being normally reproduced, the control procedure goes to the above-described step S19.

If the determination in step S38 is No, that is, if the recorded data is not being normally reproduced, the control procedure returns to the above-described step S24.

If it is determined in step S19 as No, that is, the recording destination optical disk (MD) does not have a sufficient capacity for recording the amount of replaying/recording data of the recording source optical disk (CD), the control procedure goes to step S40.

In step S40, predetermined error handling is performed, such as a display on the display unit 400 indicating that the recording capacity of the recording destination optical disk (MD) is not sufficient. The control procedure then ends.

With the above structure, when the optical disk high-speed replaying/recording apparatus HSC1 replays the recording source optical disk at a speed faster than the normal replay speed for recording the reproduced data in the recording destination optical disk in the predetermined recording units, data not normally reproduced is written in the recording destination disk, but the UTOC information about the data is not written therein. Instead, the replay speed is reduced by the predetermined amount while waiting for a recovery of data reproduction. Then, upon recovery, the UTOC information is written in the predetermined recording units. For the next data reproduction, the replay speed is back to the original high-speed replay speed before deceleration. With this, high-speed optical disk replaying and recording can be achieved at a speed suitable for the replay quality.

Furthermore, the recording units can be arbitrarily set as any of the recording source optical disks, tracks, sectors, and smaller data blocks. Therefore, reduced-high-speed replay to be performed due to defective replay can be appropriately applied. Consequently, high-speed replaying and recording can be performed while reducing influences of defective replay occurring at the recording source optical disk or occurring thereat in relation to the optical disk high-speed replaying/recording apparatus HSC1.

Preferably, the optical disk high-speed replaying/recording apparatus HSC1 uses a CD as the recording source optical disk and an MD as the writable/rewritable optical disk. However, the recording source optical disk can be an optical disk typified by a CD, a DVD, and a VCD that can be inserted in the combination drive 130. Furthermore, the writable/rewritable optical disk can be an optical disk typified by a CD-RW and a DVD-RW on which management information, such as the UTOC information, regarding the data to be recorded can be recorded at the user's side.

As has been described above, the optical disk high-speed replaying/recording apparatus according to the present embodiment can reduce the replay speed when defective replay occurs. With this, it is possible to prevent the occurrence of defective data due to high-speed replay. When yet another defective replay occurs, the replay speed is further reduced for reproduction, thereby making it possible to effectively prevent the occurrence of defective data due to high-speed replay.

Second Embodiment

Figure 3:
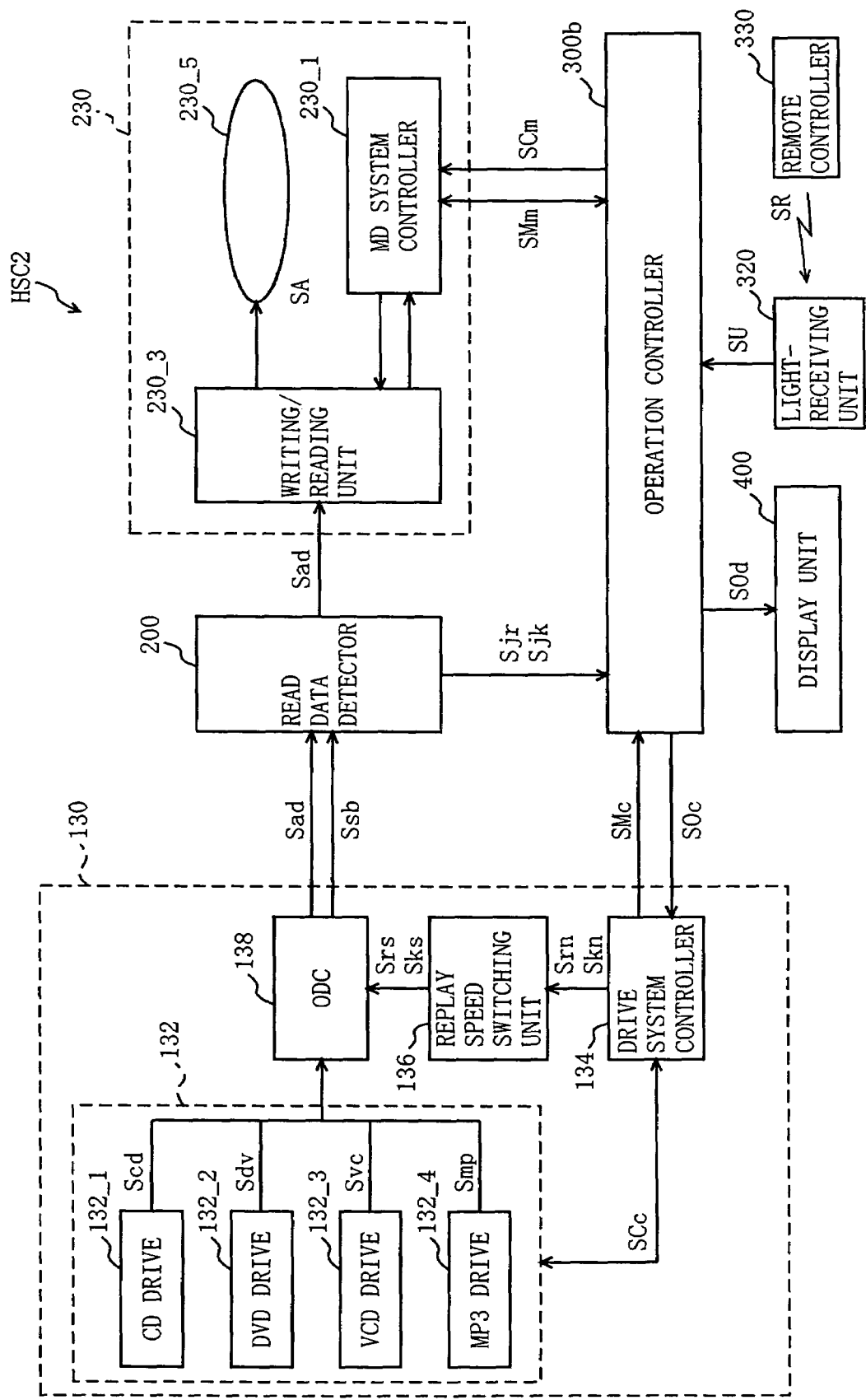
FIG. 3 is a block diagram illustrating the configuration of an optical disk high-speed replaying/recording apparatus according to a second embodiment of the present invention.

With reference to FIGS. 3, 4, 5, 6, 7, and 8, an optical disk high-speed replaying/recording apparatus according to a second embodiment of the present invention is described below. As illustrated in FIG. 3, an optical disk high-speed replaying/recording apparatus HSC2 is similar to the optical disk high-speed replaying/recording apparatus HSC1 according to the first embodiment described with reference to FIG. 1, except that the operation controller 300a is replaced by an operation controller 300b. As with the operation controller 300a, the operation controller 300b is connected to a combination drive 130, an MD drive 230, the above-described reading signal processing unit (not shown), and a display unit 400 for controlling the entire operation of the optical high-speed replaying/recording apparatus HSC2. However, the control operation performed by the operation controller 300b is slightly different from that performed by the operation controller 300a described with reference to FIG. 2. This difference will be described further below with reference to FIG. 4.

Prior to descriptions of the specific operation of the above-structured optical disk high-speed replaying/recording apparatus HSC2, a scheme used in the present embodiment for determining a high-speed replay speed suitable for each different optical disk is described with reference to FIGS. 5 through 8. Some of replay inhibiting factors, such as surface flaws or deformation of the optical disk, insertion accuracy, and circuit noise, do not pose problems at the time of normal speed replay. Obviously, however, such factors and the degree of replay inhibition due to combinations of these factors can pose problems when the recording source optical disk is rotated at a speed higher than the normal speed, such as several-fold. Moreover, since optical disks of different types require different rotation control schemes, the rotational speed may be varied depending on the read position on the optical disk even with the same replay speed. Therefore, even though the optical disks of different types having the same replay inhibiting factor are replayed at the same high speed, the read position where defective replay occurs may be varied depending on the types of optical disks (rotational control schemes).

Of the reproduction inhibiting factors, large physical defects in a medium, such as surface flaws and deformation of an optical disk, or large errors in positional accuracy, such as improper insertion of an optical disk, can cause more errors than the rotational speed may cause. In practice, however, in view of the manufacturing quality of the actual optical disk and drive apparatus, it can be assumed that the rate of rotation (rpm) of the optical disk causes far more errors than may be caused by media's physical defects or positional accuracy.

Therefore, in the present embodiment, based on the above assumption, before starting a high-speed replaying/recording operation, the highest replay speed that enables stable reproduction of data from a recording area of the optical disk at the highest rotational speed (rpm) at its peripheral area is determined as a maximum replay speed allowable in the optical disk high-speed replaying/recording apparatus HSC2. At the determined allowable maximum replay speed, the high-speed replaying/recording operation is started for the optical disk. In other words, high-speed replay capabilities are evaluated at a recording area of the optical disk most susceptible to high-speed replay and, based on the evaluation results, the allowable maximum replay speed of that optical disk is then determined. In this sense, the recording area of the optical disk susceptible to high-speed replay is referred to as a replay evaluation area.

Figure 5:
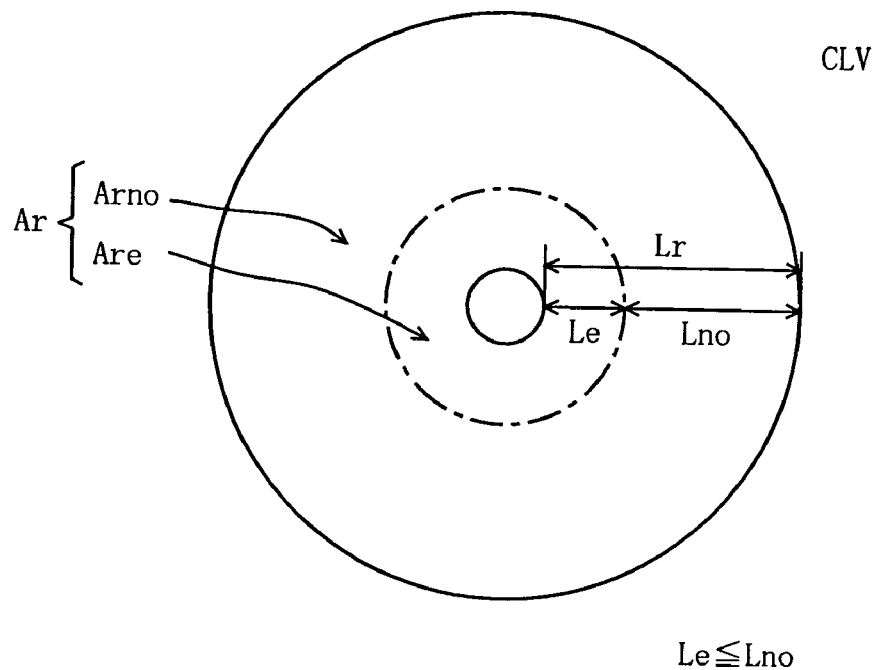
FIG. 5 is an illustration for describing an example of a relation between an unstable high-speed replay area and an outer-rim stable high-speed replay area in an optical disk of CLV scheme.

With reference to FIGS. 5 through 8, evaluation areas in optical disks of different rotation control schemes are briefly described below. FIG. 5 schematically illustrates recording areas of the optical disk under CLV control. In FIG. 5, one of two double-headed arrows in the radial direction that is located near the inner rim of the optical disk represents an unstable high-speed replay range Le that is rotated at a higher speed (angular velocity) compared with other recording areas at the time of replay, and therefore tends to cause defective reproduction. The other arrow located near the outer rim of the optical disk represents an outer-rim stable high-speed replay range Lno that tends not to cause defective reproduction compared with the unstable high-speed replay range Le. The unstable high-speed replay range Le and the outer-rim stable high-speed replay range Lno are collectively referred to as an entire replay range Lr of this optical disk.

This entire replay range Lr corresponds to a recording area Ar of this optical disk. The unstable high-speed replay range Le corresponds to an unstable high-speed replay area Are. The outer-rim stable high-speed replay range Lno corresponds to an outer-rim stable high-speed replay area Arno. Note that the unstable high-speed replay area Are is the replay evaluation area of this optical disk. The unstable high-speed replay range Le is smaller than the outer-rim stable high-speed replay range Lno. Furthermore, as a ratio of the unstable high-speed replay range Le with respect to the entire replay range Lr is smaller, the allowable maximum replay speed of the optical disk can be determined more efficiently. This determination is made also in consideration of influences of replay inhibiting factors other than the above-described rotational speed (rpm). In the case of a music CD, which is a typical example of the optical disk under CLV control, if the total recording time (Lr, Ar) is 74 minutes, a recording area (Le, Are) of around 5 minutes is preferably set as the replay evaluation area.

Figure 6:
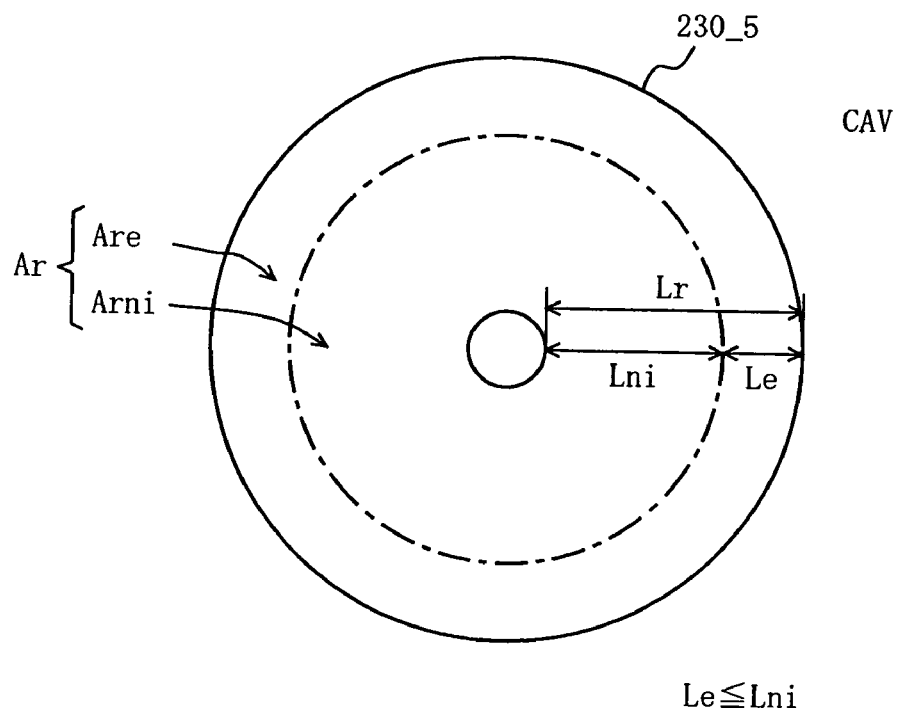
FIG. 6 is an illustration for describing an example of a relation between an unstable high-speed replay area and an inner-rim stable high-speed replay area in an optical disk of CAV scheme.

FIG. 6 schematically illustrates recording areas of the optical disk under CAV control. In FIG. 6, one of two double-headed arrows in the radial direction that is located near the outer rim of the optical disk represents an unstable high-speed replay range Le that is moving at a higher speed (linear velocity) compared with other recording areas at the time of replay, and therefore tends to cause defective reproduction. The other arrow located near the inner rim of the optical disk represents an inner-rim stable high-speed replay range Lni that tends not to cause defective reproduction compared with the unstable high-speed replay range Le. Similarly, in this optical disk, the unstable high-speed replay range Le is smaller than the inner-rim stable high-speed replay range Lni. Furthermore, as a ratio of the unstable high-speed replay range Le with respect to the entire replay range Lr is smaller, the allowable maximum replay speed of the optical disk can be determined more efficiently. Note that the inner-rim stable high-speed replay range Lni corresponds to an inner-rim stable high-speed replay area Arni.

Figure 7:
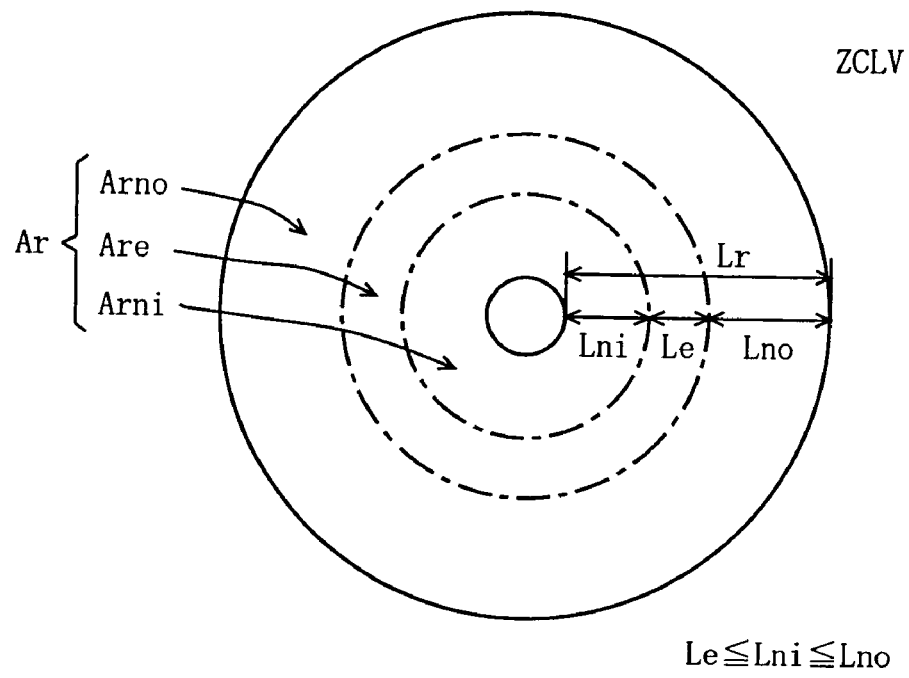
FIG. 7 is an illustration for describing an example of a relation among an inner-rim stable high-speed replay area, an unstable high-speed replay area, and an outer-rim stable high-speed replay area in an optical disk of ZCLV scheme.

FIG. 7 schematically illustrates recording areas of an optical disk under ZCLV control. In ZCLV control, CLV control is performed within a plurality of zones provided in the radial direction. That is, the rotational speed (rpm) is reduced in part at the inner-rim side, and reading is performed at the maximum speed in the remaining portions. Therefore, a portion located slightly away from the inner rim is an unstable high-speed replay range Le. Portions sandwiching the range Le are an inner-rim stable high-speed replay range Lni and an outer rim stable high-speed replay range Lno, respectively. The unstable high-speed replay range Le corresponds to an unstable high-speed replay area Are. The inner-rim stable high-speed replay range Lni corresponds to an inner-rim stable high-speed replay area Arni. The outer-rim stable high-speed replay range Lno corresponds to an outer-rim stable high-speed replay area Arno. Preferably, a relation is set so that the unstable high-speed replay range Le$\leqq$the inner-rim stable high-speed replay range Lni$\leqq$the outer-rim stable high-speed replay range Lno. An example of such an optical disk under ZCLV control is a DVD-RAM disk.

Figure 8:
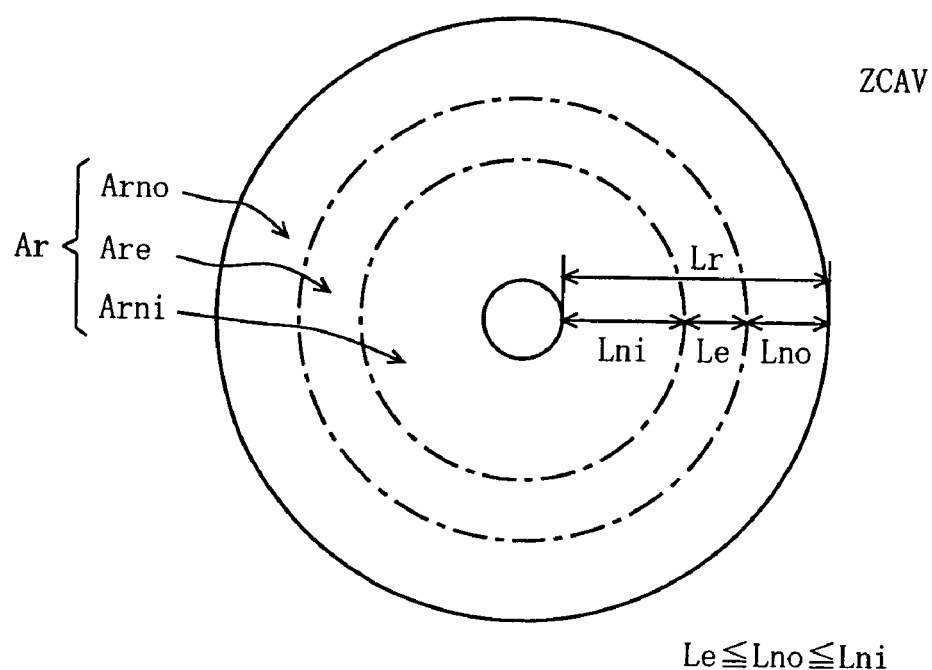
FIG. 8 is an illustration for describing an example of a relation among an inner-rim stable high-speed replay area, an unstable high-speed replay area, and an outer-rim stable high-speed replay area in an optical disk of ZCAV scheme.

FIG. 8 schematically illustrates recording areas of an optical disk under ZCAV control. In ZCAV control, CAV control is performed within a plurality of zones provided in the radial direction. Also, rotational control is performed so that a difference between the respective zones is as small as possible. Consequently, a zone in the outer rim side is rotated at higher speed (linear velocity) compared with a zone in the inner rim side. Preferably, a relation is set so that the unstable high-speed replay range Le$\leqq$the outer-rim stable high-speed replay range Lno$\leqq$the inner-rim stable high-speed replay range Lni. An example of such an optical disk under ZCAV control is an MO disk.

Note that the operation controller 300b stores in advance data defining relations among the types of optical disks, control schemes, the unstable high-speed replay range Le (the unstable high-speed replay area Are), the outer-rim stable high-speed replay range Lno (the outer-rim stable high-speed replay area Arno), and the inner-rim stable high-speed replay range Lni (the inner-rim stable high-speed replay area (Arni) described with reference to FIGS. 5 through 8.

Figure 4:
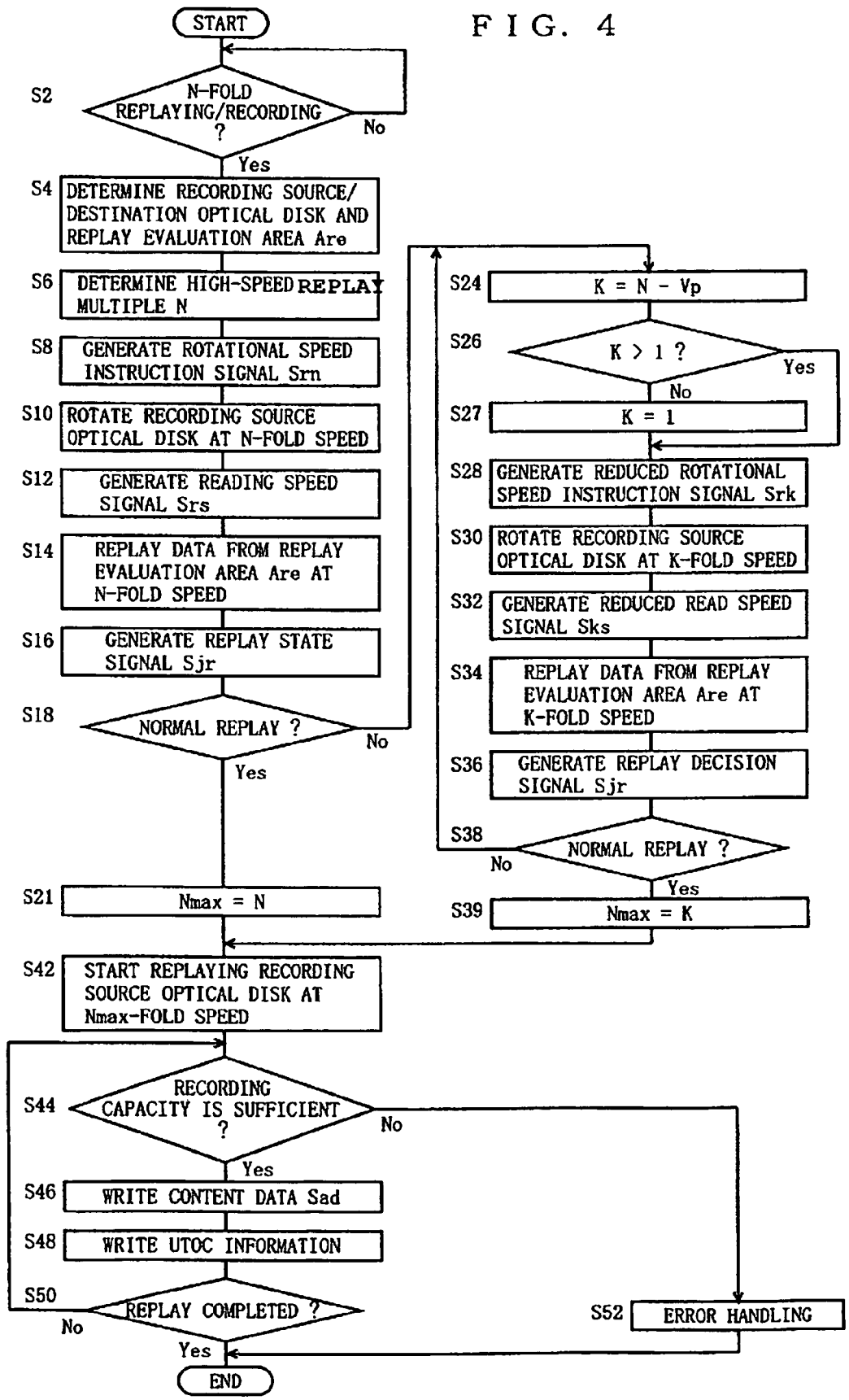
FIG. 4 is a flow chart showing the operation of the optical disk high-speed replaying/recording apparatus illustrated in FIG. 3.

With reference to a flow chart shown in FIG. 4, only the optical disk high-speed replaying/recording procedure performed by the optical disk high-speed replaying/recording apparatus HSC2 is described. When the optical disk high-speed replaying/recording apparatus HSC2 is powered ON to start the operation, the operation controller 300b first determines in step S2 based on a user instruction signal SU whether an instruction has been given for high-speed replaying/recording (at N-fold speed) of the optical disk. If the determination is No, the process of this step is repeated until the determination is Yes. The control procedure then goes to the next step S4.

In step S4, based on the user instruction signal SU, the operation controller 300b determines a recording source optical disk and recording destination optical disk. Furthermore, depending on the determined recording source optical disk, the unstable high-speed replay area Are is determined. As described above, whether a recording source optical disk (CD) and an MD (recording destination optical disk) have been inserted in the combination drive 130 and the MD drive 230 is automatically detected. Therefore, if no recording source optical disk (CD) or no recording destination optical disk (MD) has been inserted, the user cannot select high-speed recording. For this reason, in this step S4, the recording source optical disk and the recording destination optical disk are always determined. In the present example, the inserted CD and the inserted MD are determined and recognized as the recording source optical disk and the recording destination optical disk, respectively. The control procedure then goes to the next step S6.

In step S6, based on the user instruction signal SU, the operation controller 300b detects a high-speed replay multiple N, which defines by how much the normal replay speed of the recording source optical disk is multiplied. That is, in the present example, it is determined by how much the normal speed of the CD is multiplied for recording data on the MD. The high-speed replay multiple N determined in this step is supplied as a combination drive control signal SOc to the drive system controller 134. Note that the high-speed replay multiple N can be set not only based on the user's instruction, but to a value corresponding to the maximum replay speed allowable in the optical disk high-speed replaying/recording apparatus HSC2. The control procedure then goes to the next step S8.

In step S8, based on the high-speed replay multiple N, the drive system controller 134 determines the rate of rotation of the recording source optical disk to generate a rotational speed instruction signal Srn for output to the replay speed switching unit 136. As described above, depending on the type of the optical disk and the scheme for controlling the rotation of the optical disk, the number of rotations (angular velocity) defined by the rotational speed instruction signal Srn is not necessarily constant with respect to the same replay speed. Therefore, needless to say, the N-fold replay speed is not necessarily equal to the N-fold angular velocity. The control procedure then goes to the next step S10.

In step S10, based on the rotational speed instruction signal Srn, the replay speed switching unit 136 rotates the recording source optical disk (CD) inserted in the optical disk drive 132 (CD drive 132_1) at the N-fold replay speed. The control procedure then goes to the next step S12.

In step S12, the replay speed switching unit 136 detects a reading speed at the read position of the optical disk (CD) being rotated at the N-fold replay speed to generate a reading speed signal Srs for output to the optical disk controller 138. That is, the reading speed signal Srs corresponds to a speed at which data is read from the optical disk and is then supplied to the optical disk controller 138. The control procedure then goes to the next step S14.

In step S14, based on the reading speed signal Srs, the optical disk controller 138 reproduces, at the N-fold replay speed, the data (CD data Scd) being read by the optical disk drive 132 (CD drive 132_1) from the unstable high-speed replay area Are of the optical disk (CD) at the N-fold replay speed. The optical disk controller 138 then retrieves content data (audio data) Sad and management data (sub code) Ssb from the read data for output to the read data detector 200. The control procedure then goes to the next step S16.

In step S16, based on the content data (audio data) Sad and the management data (sub code) Ssb, the read data detector 200 generates a replay state signal Sjr indicative of the state of replay for output to the operation controller 300b. The control procedure then goes to the next step S18.

In step S18, the operation controller 300b determines based on the replay state signal Sjr whether the recorded data is being normally reproduced from the unstable high-speed replay area Are of the recording source optical disk (CD) at the N-fold speed designated by the user. In this example, it is determined that the data is being normally reproduced when a predetermined amount of reproduced data is supplied within a predetermined time period. Otherwise, it is determined that the data is not being normally reproduced. If the determination is Yes, that is, the data is being normally reproduced. This means that the entire optical disk can be replayed at N-fold high speed. In this sense, the replay processes in the above steps S6 through S18 form an evaluation routine for determining an allowable maximum replay speed of the optical disk. In this routine, the high speed replay capability of the recording source optical disk is evaluated at a recording area most susceptible to the influences of high-speed replay. Based on the evaluation results, the allowable maximum replay speed of that optical disk is determined. The control procedure then goes to step S21.

In step S21, an allowable maximum replay speed multiple Nmax is set as the high-speed replay speed multiple N. The control procedure then goes to the next step S42.

If the determination in step S18 is No, that is, if the recorded data is not being normally reproduced from the unstable high-speed replay area Are at the N-fold speed, the allowable maximum replay speed multiple Nmax is determined as being smaller than the high-speed replay multiple N. The control procedure then goes to step S24.

In step S24, the operation controller 300b subtracts a deceleration value Vp from the high-speed replay multiple N to find a sub-high-speed replay multiple K. The deceleration value Vp is a value appropriately predetermined with a view to recovery of the replay state from the defective state occurring at the optical disk high-speed replaying/recording apparatus HSC2 by slightly reducing the replay speed (rotational speed). Preferably, the deceleration value Vp is not larger than (the high-speed replay multiple N−1). That is, if the deceleration value Vp is N−1, the sub-high-speed replay multiple K is 1, which is equal to the normal replay speed, thereby aiming for a recovery of the replay state by replaying the recording source optical disk (CD) at the normal replay speed. The control procedure then goes to the next step S26.

In step S26, the operation controller 300b further determines whether the sub-high-speed replay multiple K is larger than 1. If the determination is Yes, that is, if the sub-high-speed replay multiple K is larger than 1, the sub-high-speed replay multiple K is supplied to the drive system controller 134 as the combination drive control signal SOc instead of the high-speed replay multiple N. The processes in steps S24 and S26 are similar to the process in the above-described step S6, but are different therefrom in the following point. That is, in step S6, the high-speed replay multiple N is determined as the user's instruction (user instruction signal SU). By contrast, in step S24, for the purpose of mitigating defective replay, the high-speed replay multiple N is reduced by the predetermined deceleration value Vp to obtain the sub-high-speed replay multiple K. The control procedure then goes to the next step S28.

If the determination is No in step S26, that is, if the sub-high-speed replay multiple K is not larger than 1, the procedure then goes to the next step S27.

In step S27, the sub-high-speed replay multiple K is set to 1 in order to prevent deceleration to a speed lower than the normal replay speed. If the speed lower than the normal replay speed is desired, however, it can be determined in step S26 whether K>0, and then K can be set in step S27 as a positive value. The control procedure then goes to the aforementioned step S28.

In step S28, as with the above-described step S8, based on the sub-high-speed replay multiple K, the drive system controller 134 determines the rate of rotation (rpm) of the recording source optical disk to generate a rotational speed instruction signal Srn for output to the replay speed switching unit 136. Here, for convenience in description, the rotational speed instruction signal Srn generated in this step is hereinafter referred to as a reduced rotational speed instruction signal Srk for identification. The control procedure then goes to the next step S30.

In step S30, as with the above-described step S10, the replay speed switching unit 136 causes, based on the reduced rotational speed instruction signal Srk, the recording source optical disk (CD) inserted in the optical disk drive 132 (CD drive 132_1) to rotate at the K-fold normal replay speed. The control procedure then goes to the next step S32.

In step S32, as with the above-described step S12, the replay speed switching unit 136 detects a reading speed at the unstable high-speed replay area Are of the optical disk (CD) being rotated at the K-fold normal replay speed to generate a reduced reading speed signal Sks for output to the optical disk controller 138. Note that the reduced speed signal Sks is basically the same as the reading speed signal Srs, but has a smaller value than the reading speed signal Srs. The control procedure then goes to the next step S34.

In step S34, as with the above-described step S14, the optical disk controller 138 causes, based on the reduced reading speed signal Sks, the optical disk drive 132 (CD drive 132_1) to reproduce, at the K-fold replay speed, data (CD data) Scd being read from the unstable high-speed replay area Are of the optical disk (CD) at the K-fold replay speed, and to retrieve content data (audio data) Sad and management data (sub code) Ssb for output to the read data detector 200. The control procedure then goes to the next step S36.

In step S36, as with the above-described step S16, the read data detector 200 generates, based on the content data (audio data) Sad and the management data (sub code) Ssb, a decelerated replay state signal Sjk indicative of the replay state at the reduced speed, and then outputs the generated signal Sjk to the operation controller 300b. The control procedure then goes to the next step S38.

In step S38, as with the above-described step S18, the operation controller 300b determines based on the decelerated replay state signal Sjk whether the recorded data from the unstable high-speed replay area Are of the recording source optical disk (CD) is being normally reproduced. If the determination is Yes, that is, if the recorded data is being normally reproduced, the control procedure goes to step S39, which will be described further below.

If the determination in step S38 is No, this means that the entire recording source optical disk cannot be replayed at the K-fold speed corresponding to the current sub-high-speed replay multiple K. The control procedure then returns to the above-described step S24 to repeat the processes in steps S26 through S36. Then, it is again determined in step S38 whether this recording source optical disk can be replayed with the current sub-high-speed replay multiple K.

In this manner, steps S24 through S38 form a routine for determining an allowable maximum replay speed of the optical disk, as the processes in the above-described steps S6 through S18. In steps S6 through S18, however, the allowable maximum replay speed multiple Nmax is set so as to have a value designated by the optical disk high-speed replaying/recording apparatus HSC2 or the user. Therefore, there is a disadvantageous possibility that the allowable maximum replay speed inherent in the recording source optical disk has not been detected. This disadvantage can be effectively eliminated by setting the allowable maximum replay speed multiple Nmax based on the manufacturing quality of the optical disk allowing the high-speed replay multiple N.

Furthermore, in steps S6 through S18, if the allowable maximum replay speed inherent in the recording source optical disk is lower than the N-fold speed, the allowable maximum replay speed of the optical disk for use in the optical disk high-speed replaying/recording apparatus HSC2 can be practically calculated. The allowable maximum replay speed can be more accurately calculated when the deceleration value Vp is smaller. However, when the deceleration value Vp is too small, it takes time to calculate the allowable maximum replay speed, which is not practical.

In step S39, the allowable maximum replay speed multiple Nmax is set to the sub-high-speed replay multiple K. The control procedure then goes to the next step S42.

In step S42, a high-speed replay process is started with the allowable maximum replay speed multiple Nmax from the first read position of the recording source optical disk. The control procedure then goes to the next step S44.

In step S44, the MD drive 230 determines whether the writable/rewritable optical disk 230_5 has a recording capacity capable of recording the content data Sad supplied thereto. If the capacity is sufficient, the determination is Yes, and then the control procedure goes to step S46.

In step S46, the writing/reading unit 230_3 writes the content data Sad supplied via the read data detector 200 to the MD drive 230 in the writable/rewritable optical disk (MD) 230_5 in predetermined recording units. In the present invention, the recording units can be units of sectors, units of tracks, units of recording source or destination optical disk. In the present embodiment, however, units smaller than units of sectors are preferable. In this manner, the content data Sad sequentially read from the recording source optical disk (CD) is written in the writable/rewritable optical disk 230_5 in recording units smaller than units of sectors.

As described above, in the present embodiment, in the above allowable maximum replay speed evaluation routine (steps S6 through S18/steps S24 through S38), the data read and reproduced from the recording source optical disk is only used for allowable maximum replay speed evaluation, and is not recorded in the recording destination optical disk. Alternatively, it is effective that such data is not only used for allowable maximum replay speed evaluation, but is also written in a predetermined location on the recording destination optical disk. This can eliminate the process at the time of replay for skipping replay of the unstable high-speed replay area Are, thereby reducing the total time required for replaying/recording. This is particularly convenient for such an optical disk under CLV control, such as a CD, whose unstable high-speed area Are is located at the inner most rim of the recording area Ar. The control procedure then goes to the next step S48.

In step S48, UTOC information regarding writing in step S46 of the content data Sad in the writable/rewritable optical disk 230_5 (MD) is generated by the MD system controller 230_1, and is then written in an UTOC area of the writable/rewritable optical disk 230_5 (MD). The control procedure then goes to the next step S50.

In step S50, the operation controller 300b determines whether the replay of the recording source optical disk has been completed. If the determination is Yes, the high-speed replaying/recording operation of the optical disk high-speed replaying/recording apparatus HSC2 ends. If the determination in the above step S50 is No, that is, if it is determined that high-speed replay of the recording source optical disk is not completed, the control procedure returns to the above-described step S44 for continuing reproduction from unrecorded portions of the recording area Ar at the allowable maximum replay speed (Nmax).

If the determination in the above step S44 is No, that is, if the recording capacity of the recording destination disk (MD) is not sufficient for the amount of data to be reproduced or recorded, the control procedure goes to step S52.

In step S52, predetermined error handling is performed, such as a display on the display unit 400 indicating that the recording capacity of the recording destination optical disk (MD) is not sufficient. The control procedure then ends.

With the above structure, the high-speed replay reproducing/recording apparatus HSC of the present invention can perform replaying at a replay speed suitable for the optical disk and records data on a writable optical disk without causing data defects.

Preferably, the optical disk high-speed replaying/recording apparatus HSC2 uses a CD as the recording source optical disk and an MD as the writable/rewritable optical disk. However, the recording source optical disk can be an optical disk typified by a CD, a DVD, and a VCD that can be inserted in the combination drive 130. Furthermore, the writable/rewritable optical disk can be an optical disk typified by a CD-RW and a DVD-RW on which management information, such as the UTOC information, regarding the data to be recorded can be recorded at the user's side.

Furthermore, the unstable high-speed replay area Are and the recording area Ar basically have the relation described with reference to FIGS. 5, 6, 7, and 8. However, depending on the characteristics of the optical disk high-speed replaying/recording apparatus HSC2, manufacturing quality of the recording source optical disk, or combination of both, the unstable high-speed replay area Are can be appropriately determined. That is, in the optical disk high-speed replaying/recording apparatus HSC2 in use, it is possible to appropriately select a portion where reproduction defects tend to occur in high-speed replay compared with other recording areas as the unstable high-speed replay area Are.

As described above, in the optical disk high-speed replaying/recording apparatus HSC2 according to the second embodiment, reproduction defects do not occur even when the entire optical disk is replayed at the same replay speed. Also, advantageously, it is possible to newly set a maximum high-speed replay speed suitable for even an optical disk that cannot be replayed at another maximum high-speed replay speed set in advance by another high-speed replaying/recording apparatus.

While the invention has been described in detail, the foregoing description is in all aspects illustrative and not restrictive. It is understood that numerous other modifications and variations can be devised without departing from the scope of the invention.

What is claimed is:

1. An optical disk high-speed replaying/recording apparatus for reading, from a first optical disk having recorded thereon digital data in first units to be reproduced at a first replay speed, the digital data in second units smaller than the first units at a second replay speed higher than the first replay speed, and writing the read second units of digital data in a writable second optical disk, so as to reform the first units in the second optical disk, the apparatus comprising:
first read data quality determining means for determining a quality of the read second units of digital data; and
first re-reading means for re-reading, upon determination that the quality of the second units of digital data is low, the digital data in the second units at a third replay speed obtained by subtracting a first predetermined speed from the second replay speed.

2. The optical disk high-speed replaying/recording apparatus according to claim 1, further comprising:
second read data quality determining means for determining a quality of the re-read second units of digital data; and
second re-reading means for re-reading, upon determination that the quality of the re-read second units of digital data is low, the digital data in the second units at a fourth replay speed obtained by subtracting a second predetermined speed from the third replay speed.

3. The optical disk high-speed replaying/recording apparatus according to claim 2, wherein
the first predetermined speed is equal to the second predetermined speed.

4. The optical disk high-speed replaying/recording apparatus according to claim 1, wherein
the first predetermined speed has an arbitrary value so that the third replay speed is higher than the first replay speed.

5. The optical disk high-speed replaying/recording apparatus according to claim 2, wherein
the second predetermined speed has an arbitrary value so that the fourth replay speed is higher than the first replay speed.

6. The optical disk high-speed replaying/recording apparatus according to claim 1, wherein
the second units are any of tracks, sectors, and data blocks.

7. The optical disk high-speed replaying/recording apparatus according to claim 1, wherein
upon writing of the first units of digital data in the second optical disk, management information of the first units of digital data is written in a record data management information storage area of the second optical disk.

8. The optical disk high-speed replaying/recording apparatus according to claim 7, wherein
the second optical disk is an MD-R disk, the record data management information storage area is an UTOC area, and the management information is UTOC information.

9. The optical disk high-speed replaying/recording apparatus according to claim 1, wherein
the first optical disk is a CD-R disk.

10. An optical disk high-speed replaying/recording apparatus for reading data from a first optical disk having recorded thereon first digital data to be reproduced at a first replay speed at a second replay speed higher than the first replay speed, reproducing the read data as second digital data, and recording the reproduced second digital data in the second writable optical disk, the apparatus comprising:
fastest possible replay speed detecting means for detecting, based on a piece of the second digital data reproduced from a predetermined portion of a recording area of the first optical disk, a fastest possible replay speed applicable to an entire recording area of the first optical disk;
optical disk replaying means for reproducing the second digital data from the first optical disk at the fastest possible replay speed; and
optical disk recording means for recording the second digital data on the second optical disk,
wherein the fastest possible replay speed detecting means includes:
high-speed reproducing means for reproducing the second digital data from the predetermined portion at the second replay speed;
reproduced digital data quality determining means for determining a quality of the second digital data reproduced by the high-speed reproducing means; and
high-speed replaying control means for determining, upon determination that the quality of the reproduced second digital data is low, a third replay speed by subtracting a predetermined speed from the second replay speed until a determination is made that the quality is high, and causing the high-speed reproducing means to reproduce the second digital data from the predetermined portion at the third replay speed for output to the reproduced digital data quality determining means.

11. The optical disk high-speed replaying/recording apparatus according to claim 10, wherein
the predetermined speed has a value smaller than a value obtained by subtracting the first replay speed from the second replay speed.

12. The optical disk high-speed replaying/recording apparatus according to claim 11, wherein
the fastest possible replay speed detecting means further includes maximum speed detecting means for determining, as the fastest possible replay speed, the third replay speed which is used upon determination that the quality of the second digital data is high.

* * * * *